(12) United States Patent
Gamel et al.

(10) Patent No.: US 8,995,995 B2
(45) Date of Patent: Mar. 31, 2015

(54) SYSTEM AND METHOD FOR ENHANCED AUTOMATIC ROAMING

(75) Inventors: Bennett Gamel, Overland Park, KS (US); Robert John Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1031 days.

(21) Appl. No.: 12/141,217

(22) Filed: Jun. 18, 2008

(65) Prior Publication Data

US 2009/0318140 A1 Dec. 24, 2009

(51) Int. Cl.
*H04W 4/00* (2009.01)
*H04W 36/30* (2009.01)

(52) U.S. Cl.
CPC ..................................... *H04W 36/30* (2013.01)
USPC ........ 455/432.1; 455/574; 455/436; 455/437; 455/438; 455/440; 455/441; 455/442; 455/443; 455/444; 455/432.3; 455/432.2; 455/439

(58) Field of Classification Search
USPC ................ 455/432.1, 432.2, 432.3, 436, 574
See application file for complete search history.

(56) References Cited

U.S. PATENT DOCUMENTS

| | | | | |
|---|---|---|---|---|
| 5,845,211 A * | 12/1998 | Roach, Jr. | ...................... | 455/436 |
| 6,259,892 B1 * | 7/2001 | Helferich | ........................ | 340/7.2 |
| 7,457,598 B2 * | 11/2008 | Zahm et al. | ................. | 455/245.1 |
| 7,596,194 B2 * | 9/2009 | Janky | ............................ | 375/346 |
| 2005/0078031 A1 * | 4/2005 | Park et al. | ................. | 342/357.12 |
| 2007/0123252 A1 * | 5/2007 | Tronc et al. | ..................... | 455/427 |
| 2007/0274488 A1 * | 11/2007 | Callaghan | ................ | 379/201.01 |
| 2008/0014943 A1 * | 1/2008 | Ahn et al. | ...................... | 455/436 |
| 2008/0039078 A1 * | 2/2008 | Xu et al. | ..................... | 455/432.1 |

\* cited by examiner

*Primary Examiner* — Vladimir Magloire
*Assistant Examiner* — Shantell L Heiber
(74) *Attorney, Agent, or Firm* — Swanson & Bratschun, L.L.C.

(57) ABSTRACT

A system and method for automatically roaming with a wireless device. A signal strength of a first wireless signal is sampled at a time interval. A determination is made whether the signal strength is less than a threshold for a predetermined duration. The wireless device is set to roam on a second wireless signal in response to the signal strength of the first wireless signal being less than the threshold for the predetermined duration. The wireless device is reset to a default setting for communication after a predetermined duration.

18 Claims, 5 Drawing Sheets

SYSTEM AND METHOD FOR ENHANCED AUTOMATIC ROAMING

BACKGROUND OF THE INVENTION

The use of and development of wireless communications has grown nearly exponentially in recent years. The growth is fueled by larger networks with more reliable protocols and better communications hardware available to service providers and consumers. Despite the vast improvements, wireless systems and devices still have distinct limitations. In particular, almost all wireless users have experienced a poor or inadequate signal environment in which a calling party and/or a receiving party are unable to carry on a conversation because of dropped calls, errors, unintelligible voice communications, dropped packets, and other similar results of a weak or poor signal.

A weak signal may result because of a geographic location, such as buildings and topography, inadequate signal strength or hardware, or a myriad of other factors that may or may not be controllable by the wireless service provider. Some wireless service providers are reluctant to allow their customers to roam to other wireless service providers because of increased costs, perception of poor coverage or poorly designed networks and systems. As a result, many wireless users experience poor wireless service based on the available settings, options, and software.

BRIEF SUMMARY OF THE INVENTION

One embodiment provides a system and method for automatically roaming with a wireless device. A signal strength of a first wireless signal may be sampled at a time interval. A determination may be made whether the signal strength is less than a threshold for a predetermined duration. The wireless device may be set to roam on a second wireless signal in response to the signal strength of the first wireless signal being less than the threshold for the predetermined duration. The wireless device may be reset to a default setting for communication after a predetermined duration.

Another embodiment provides a wireless device configured for user selected roaming. The wireless device may include signal logic configured to sample a signal strength of a first wireless signal based on a user selection, determine whether the signal strength is less than a threshold, configure the wireless device to roam to a second wireless signal in response to the signal strength of the first wireless signal being less than the threshold, and reset the wireless device to communicate through the first wireless signal after a time period has elapsed. The wireless device may also include multiple timers in communication with the signal logic. The multiple timers may be operable to measure the sample interval and the time period.

Another embodiment provides a wireless device configured for user selected roaming. The wireless device may include a processor for executing a set of instructions and a memory in communication with the processor configured to store the set of instructions. The set of instructions may be configured to sample a received signal strength of one or more wireless signals at an interval, switch from a first wireless signal to a second wireless signal in response to the received signal strength of the first wireless signal being utilized by the wireless device being less than a threshold specified by a user for a time period and further in response to the wireless device not being in use.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

The illustrative embodiments provide a system and method for enhanced automatic roaming (EAR). A user may configure a wireless device to automatically enter a roaming-only mode during which the wireless device seeks out a wireless signal other than that provided by the default communications service provider. In one embodiment, the wireless device may be configured to automatically enter the roaming-only mode based on specified received signal strength thresholds and time values. In another embodiment, the wireless device may enter the roaming-only mode based on a manual selection by the user. The illustrative embodiments may ensure that the user is able to effectively communicate through the wireless device when alternative signals from other communications service providers are available.

Figure 1:
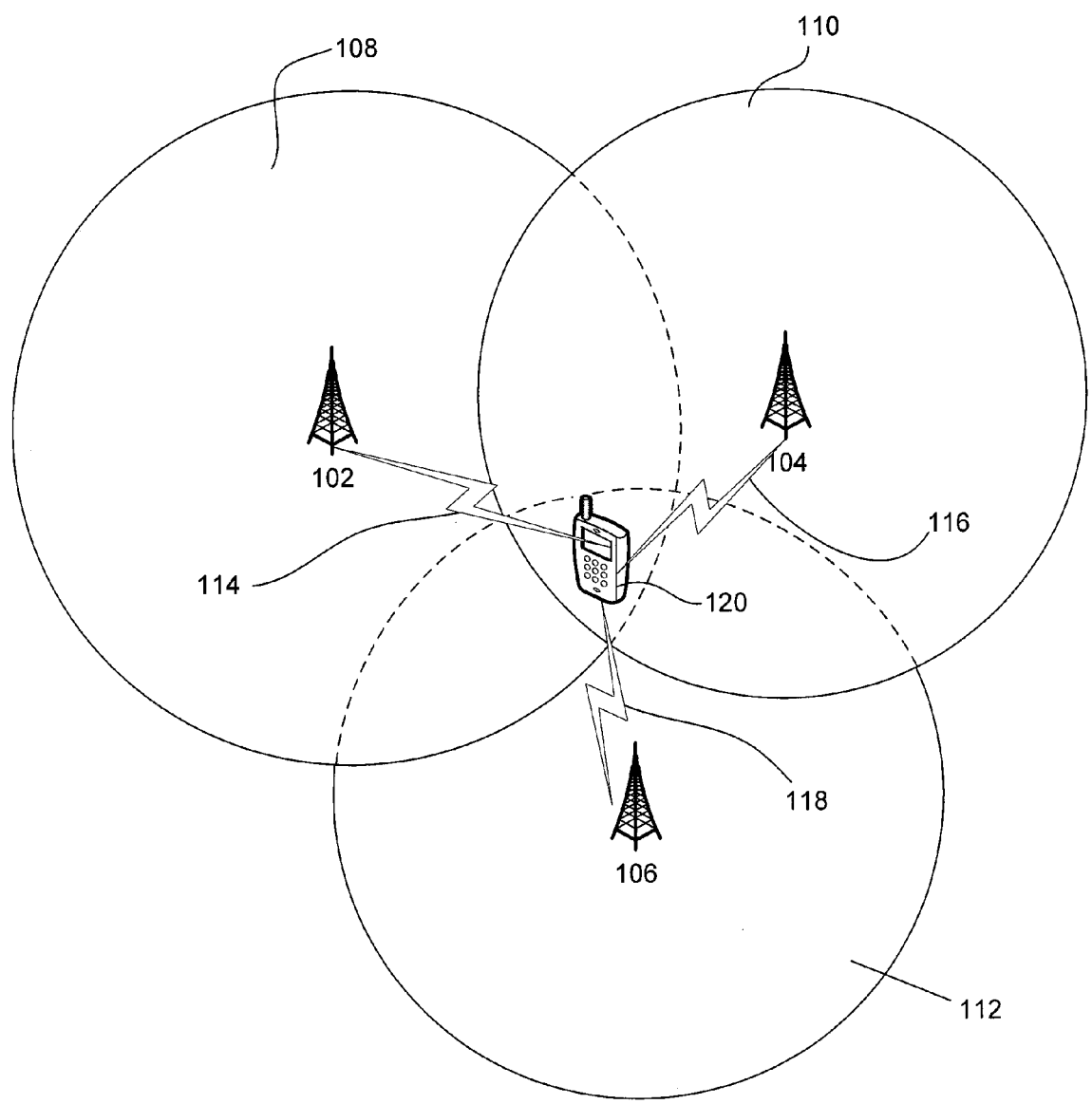
FIG. 1 is a pictorial representation of a communications environment in accordance with an illustrative embodiment.

FIG. 1 is a pictorial representation of a communications environment in accordance with an illustrative embodiment. FIG. 1 illustrates one embodiment of a communications environment 100 that may include any number of elements. In one embodiment, the communications environment 100 includes transmission towers 102, 104, and 106, cells 108, 110, and 112, wireless signals 114, 116, and 118, and wireless device 120. The communications environment 100 represents a location or environment in which a user may utilize the wireless device 120. For example, the communications environment 100 may encompass a user's home, workplace, and home city. The towers 102, 104, and 106, and cells 108, 110, and 112 are the base stations, transceivers, and other elements and components of multiple wireless networks. The cells 108, 110, and 112 may illustrate the range of reception for communicating with wireless networks utilizing the wireless signals 114, 116, and 118.

The wireless device 120 may be a cell phone, laptop, BlackBerry, PDA, data card, mp3 player, global positioning system, multi-mode device or other device enabled for wireless communication. The user may utilize the wireless device 120 for business, personal or organizational use. As shown, the signal strength for each of the cells 108, 110, and 112 may vary based on the proximity to the towers 102, 104, and 106 or other broadcasting equipment, respectively, as well as the geography and structure of the wireless environment 100. In one embodiment, the towers 102, 104, and 106 may transmit the wireless signals 114, 116, and 118 at different intensities or channels that may propagate according to different characteristics. As a result, the quality of the wireless signals 114, 116, and 118 may vary at the current location of the wireless device 120.

The wireless device 120 may communicate with the towers 102, 104, and 106 in the communications environment 100 using communications networks, standards or protocols, such as time division multiple access (TDMA), code division multiple access (CDMA), global systems for mobile (GSM) communications, personal communications systems (PCS), WLAN, WiMAX, or other suitable cellular and data communications protocols and standards.

For purposes of illustration, the different elements of wireless networks provided by multiple communications service providers are simply represented by the cells 108, 110, and 112, towers 102, 104, and 106, and wireless signals 114, 116, and 118. The wireless networks may utilize any number of communications management devices, antennas, databases, records, transceivers, servers, switches, offices or other wireless broadcasting equipment as understood by one with skill in the art.

For illustrative purposes, the wireless signals 114, 116, and 118 may be received by the wireless device 120 at levels that may be classified as strong, weaker, and weakest. The cell 110 may be the home cell, network or default communications service provider of the wireless device 120. In other words, the cell 110 and corresponding tower 104 may represent the wireless network associated with the user's communications service provider. For example, the user may have contracted with the owner/operator of cell 108 to receive wireless services for the wireless device 120. As a result, the user may typically use the wireless signal 116 while traveling or located within the geographic location or range of the cell 110.

The cells 108 and 112 may be generated by different communications service providers that are not the home or default communications service provider of the wireless device 120. In one embodiment, the wireless device 120 may be required to roam in order to utilize the wireless signals 114 and 118. For example, the home communications service provider of the wireless device 120 may have configured the wireless device 120 to communicate with the tower 104 until the signal strength drops below a specified threshold. The specified threshold may be insufficient to allow the user of the wireless device 120 to be able to effectively communicate. For example, during a phone call, the wireless device 120 may drop packets or portions of the signal resulting in the call becoming lost or unintelligible. Alternatively, the wireless device 120 may be unable to send and receive text or e-mail messages. The signal strength of the wireless signal 116 may deteriorate as the wireless device 120 moves further from the tower 104.

The illustrative embodiment may allow the user to automatically or manually select to utilize the cell 108 and corresponding wireless signal 114. For example, the user may specify a threshold utilized by the wireless device 120. If the signal strength drops below the user specified threshold and meets other user designated criteria or function parameters, the wireless device 120 may automatically select to roam to the cell 108 and corresponding wireless signal 114. For example, the user may configure the wireless device 120 so that if the signal strength is below the user specified threshold for longer than three minutes, as sampled by the wireless device 120, the wireless device may automatically roam away from the cell I 10. As a result, the wireless device 120 may utilize the cell 108 rather than the cell 112 because based on the user's location and current circumstances the cell 108 may offer the wireless signal 114 with an enhanced signal strength. The determination to use the cell 112 may also be based on the preferred roaming list (PRL) utilized by the wireless device 120 which may have the cell 108 or associated provider listed as a next alternate to the default communications service provider.

While utilizing the wireless signal 114, the wireless device 120 may be able to make and receive calls and transmit any number of messages or other data communications without dropped calls, errors or other communications related problems. After a designated time period, the wireless device 120 may be configured to stop roaming and reacquire the wireless signal 116 for using the systems of the user's default communications service provider. If, however, there continues to be insufficient signal strength based on the user specified threshold, the wireless device 120 may continue to roam and access the wireless signal 114 or seek out another wireless network.

Similarly, if the wireless signal 114 drops below the user specified threshold, the wireless device 120 may roam to the cell 112 or another cell, wireless signal or available communications service provider. In another embodiment, the user may enter user input on the wireless device 120 to roam from the cell 110 provided by the user's communications service provider to an alternate cell, such as cell 108 provided by another communications service provider.

In either the automatic or manual roaming selection modes, the wireless signal or communications service provider utilized by the wireless device 120 may be selected based on a PRL negotiated between the user's communications service provider and a number of other communications service providers. Alternatively, the user may select to utilize the communications service provider based on the highest quality signal strength from the other wireless signals 114 and 118. The user's communications service provider may charge the user additional fees or increase expenses based on roaming to either of the cells 108 or 112. In some instances, the communications service providers may not have a deal regarding shared services and as a result the wireless device 120 may not be able to use certain wireless networks. However, in some cases, for enhanced service the user may determine that such a switch is worth the improvements in signal quality and communication. The illustrative embodiment may allow a user to enter a roaming mode even if the user's default communications service provider has set a service threshold for the signal strength that is impractical or insufficient for the user's needs. The user specified threshold may override one or more thresholds specified by the communications service provider based on an EAR application or logic executed by the wireless device 120.

Figure 2:
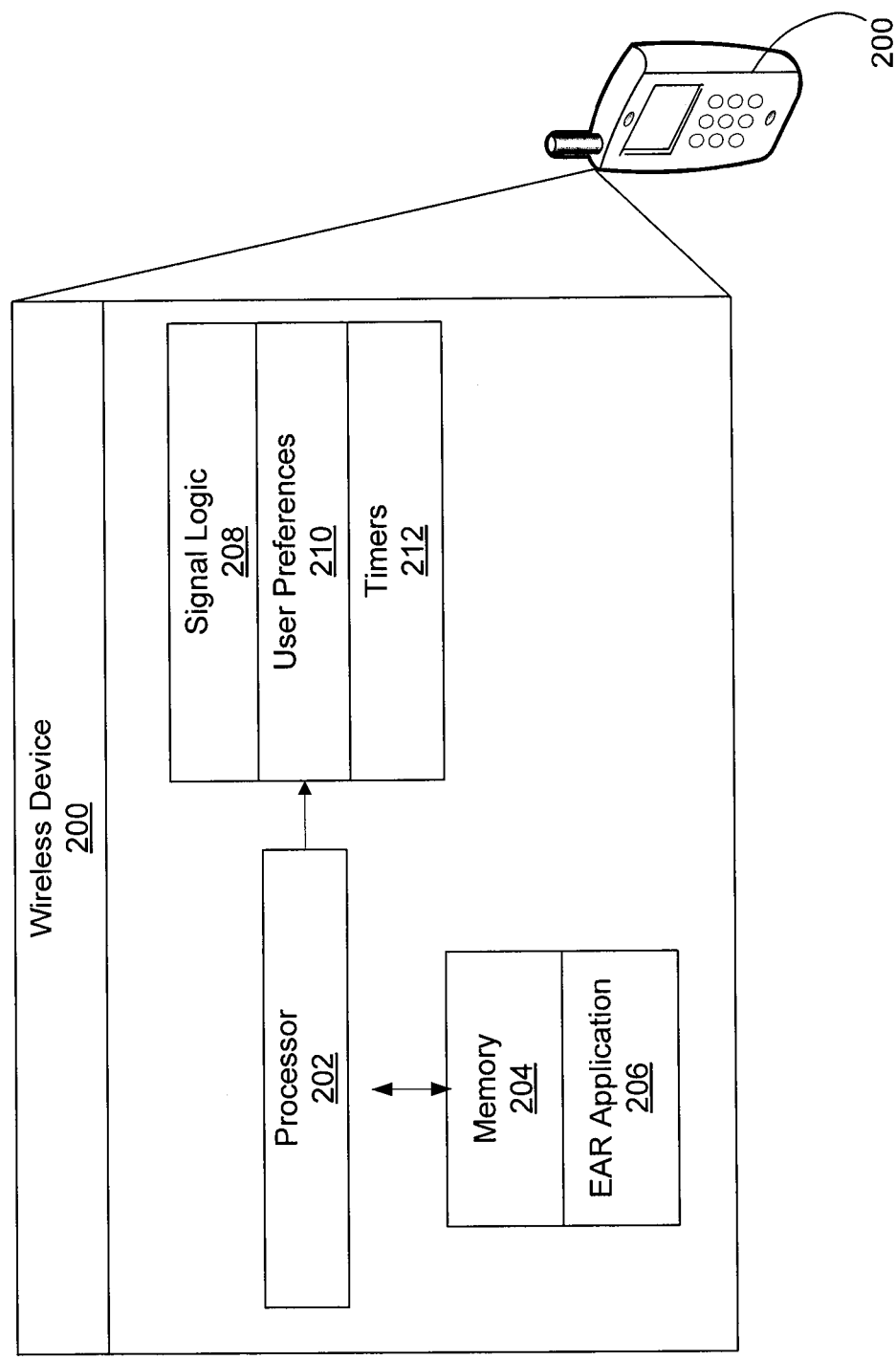
FIG. 2 is a block diagram of a wireless device in accordance with an illustrative embodiment.

FIG. 2 is a block diagram of a wireless device 200 in accordance with an illustrative embodiment. The wireless device 200 is a particular embodiment of the wireless device 120 of FIG. 1. The wireless device 200 may include a processor 202, a memory 204, an EAR application 206, signal logic 208, user preferences 210, and timers 212. The illustrative embodiment may be implemented by the enhanced automatic roaming (EAR application 206). The EAR application 206 may be stored in the memory 204 for execution by the processor 202.

In another embodiment, the EAR application 206 may be integrated as part of the signal logic 208, user preferences 210, and timers 212 that further implement the illustrative embodiments as described herein. Illustrative embodiments of the automatic and manual roaming mode processes and features that may be utilized by the EAR application 206 are further described in FIGS. 3 and 4.

The signal logic 208 is the discrete component and/or software that may be utilized to perform automatic or manual roaming. In one embodiment, the signal logic 208 may be configured to sample the signal strength provided by one or more communications service providers at specified intervals or times. The signals may be received by a transceiver and measured and rated by the signal logic 208. The signal logic 208, user preferences 210, and timers 212 may be integrated with the EAR application 206 and may work in conjunction with the EAR application 206 or may be independent and function separately from the EAR application 206. The signal logic 208 also determines the wireless signals that may be available to the wireless device 200.

In one embodiment, the wireless signals and their corresponding signal strength may be displayed to the user through a user interface or display of the wireless device 200. Similarly, the signal logic 208 may display the threshold specified by the user and/or a threshold specified by the communications service provider as a default setting of the wireless device 200. The user may specify the timer, counter, and threshold values utilizing an interactive voice response system of the wireless device 200, touch screen, graphical user interface, tactile interface or other interactive elements for receiving user input.

The timers 212 are timing elements that measure the passage of time. In one embodiment, the timers 212 may specify a time interval between the time that the signal logic 208 samples the signal strength of one or more wireless signals provided by communications service providers. For example, the timers 212, which may include a sample duration timer, may send a command to the signal logic 208 to do a sample of the signal strength of one or more wireless signals. The timers 212 may also include a duration timer that specifies how long the wireless device 200 remains in a roaming-only mode before returning to default settings, retesting the signal strength of one or more signals or resetting to acquire a wireless signal provided by a default communications service provider. The timers 212 or signal logic may also include a counter or timer for determining a time period or number of measurements that the measured signal strength is below a threshold. For example, if the sampled signal strength is below a threshold three times as measured by a marginal signal decrementing counter (MSDC) or for three minutes, the timers 212 may command the signal logic 208 or EAR application 206 to enter a roaming-only mode. The sample duration timer may measure a sample interval or sample time period, the duration timer may measure a reset interval or time period, and the counter may measure a time period, value or number of times the signal strength is below the threshold.

The user preferences 210 are the user settings, criteria, parameters, and administrative options that control the automatic and manual roaming features and modes of the wireless device 200 within the EAR application 206, signal logic 208, and timers 212. For example, the user preferences 210 may specify the intervals for time measurements utilized by the timers 212 to measure a sample duration time, marginal signal time or duration time, as described herein. The user preferences 210 may also store threshold values. The threshold values may differ for one or more different types of communication. For example, the threshold value for voice communications and data communications may be different based on a variety of factors, such as the effect that a lower signal strength may have on a voice communication as compared to data communications or a multi-radio handset operating concurrently at different frequencies. In another embodiment, the user may utilize the user preferences 210 in order to view the billing information based on the established thresholds and other criteria. For example, the higher the signal strength at which the user adjusts the signal thresholds, the more likely the wireless device 200 is to roam to other communications service providers which may thereby increase the user's bill or ongoing expenses accrued by usage of the wireless device 200.

Figure 3:
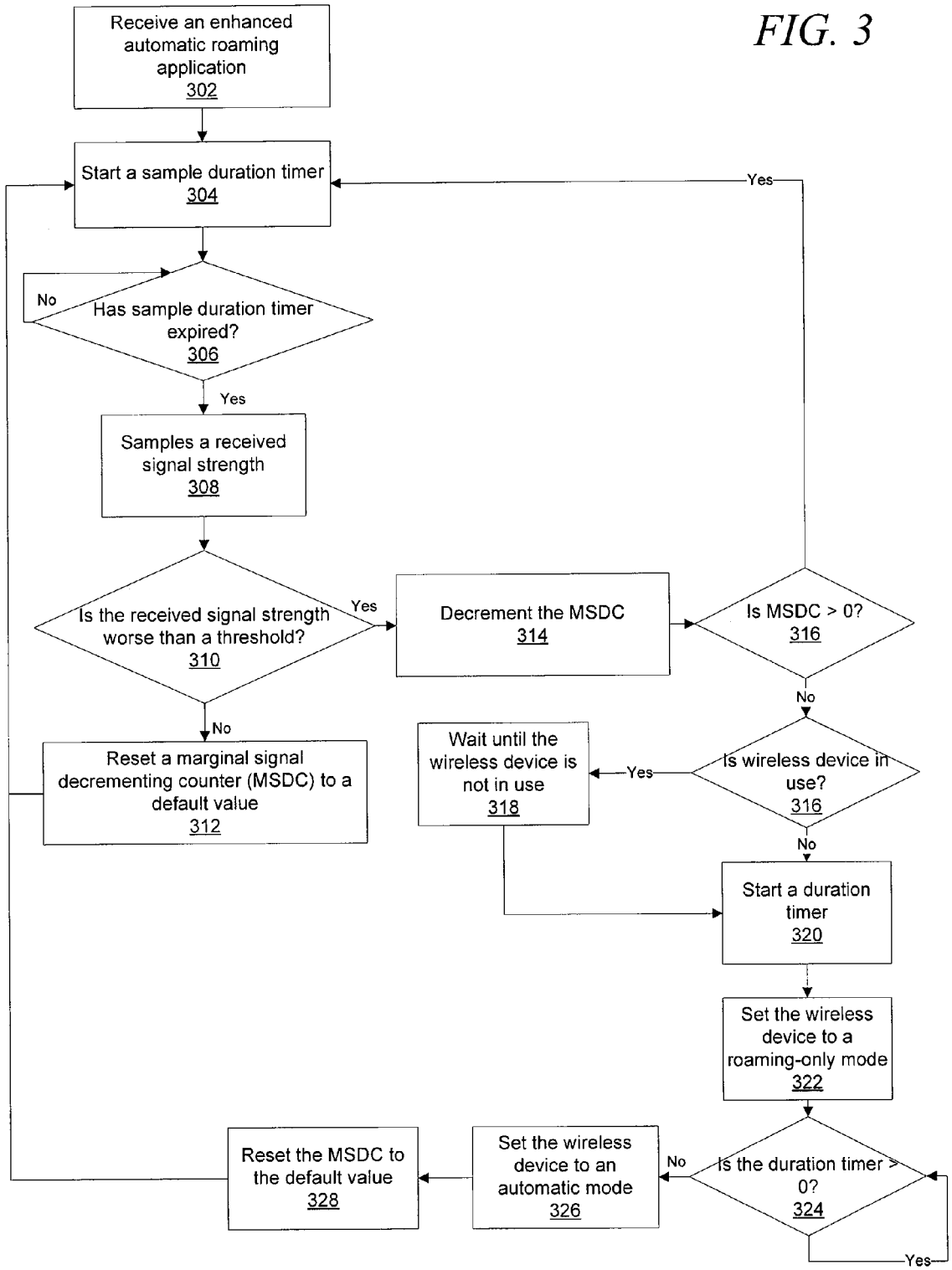
FIG. 3 is a flowchart of a process for enhanced automatic roaming (EAR) in accordance with an illustrative embodiment.

FIG. 3 is a flowchart of a process for enhanced automatic roaming in accordance with an illustrative embodiment. The process of FIG. 3 may be implemented by a wireless device such as a cell phone. The process of FIG. 3 may begin by receiving an enhanced automatic roaming application (step 302). In one embodiment, the automatic roaming application may be installed on the wireless device as an add-on or user-selected application. In another embodiment, the EAR application may be stored on the cell phone during installation or initial configuration of the wireless device. For example, a communications service provider may have the EAR application loaded onto the wireless device as part of the manufacturing process. In yet another embodiment, the EAR application may be hardware, software, and firmware that may be integrated with the functions of the wireless device.

Next, the wireless device starts a sample duration timer (step 304). The sample duration timer and the other timers and counters described in FIG. 3 may be configured to function based on default values or based on user preferences. For example, the user may set the time periods or a method of timekeeping for each specified timer. The sample duration timer of step 304 may determine how often the wireless device samples a received signal strength of the default communications service provider or when the defaults communications service provider is not available, the wireless device samples the next wireless network or system identified by the PRL, and so on, until an acceptable signal is found. In another embodiment, the wireless device may sample wireless signals from one or more communications service providers and networks simultaneously.

Next, the wireless device determines whether the sample duration timer has expired (step 306). If the sample duration timer has not expired, step 306 is repeated continuously until it does expire. If the sample duration timer has expired in step 306, the wireless device samples a received signal strength (step 308). The received signal strength may be measured on a designated scale. For example, in one embodiment, the received signal strength may be a decibel measurement determined by the wireless device measuring with the EAR application rating the signal strength measurement between zero indicating no signal and 10 indicating a perfect signal. Any number of other scales or ratings may also be utilized.

Next, the wireless device determines whether the received signal strength is worse than a threshold (step 310). If the received signal strength is not worse than a threshold, the wireless device resets a marginal signal decrementing counter (MSDC) to a default value (step 312) before returning to start the sample duration timer (step 304).

If the received signal strength is worse than a threshold in step 310, the wireless device decrements the MSDC (step 314). Next, the wireless device determines whether the MSDC is greater than zero. If the MSDC is greater than zero, the wireless device starts a sample duration timer (step 304). If the MSDC is not greater than zero in step 316, the wireless device determines whether the wireless device is in use (step 316). If the wireless device is in use, the wireless device waits until the wireless device is not in use (step 318).

Next, the wireless device starts a duration timer (step 320). If the wireless device is not in use in step 316, the wireless device immediately starts the duration timer (step 320). Next, the wireless device sets the wireless device to a roaming-only mode (step 322). During step 322, the wireless device may abandon attempting to use a weak signal available through the user's default communications service provider in order to utilize a stronger signal provided by another communications service provider. During the roaming-only mode, the user may configure the wireless device to continue to use the preferred roaming list available on the wireless device to minimize costs charged to the user. The wireless device may display an alert, alarm, approval notice charge rate or other information once the roaming-only mode is implemented. In one embodiment, the wireless device may display the increased cost to the user of utilizing the alternative wireless network of a communications service provider. During step 322, the wireless device may utilize one or more communications service providers based on a specified threshold for the received signal strength. For example, if a first and second wireless signal of service providers listed on the PRL are insufficient to meet the threshold, the wireless device may roam to a third wireless signal.

In another embodiment, the wireless device may be configured to utilize the strongest signal available based on providers included on the PRL. Utilizing the strongest signal may mean that the user is charged additional fees, expenses or costs by not using the next listed communications service provider on a preferred roaming list. However, in some cases, the additional expense may be worth the added cost to the user. The EAR application may determine whether the wireless device is in use to ensure that a transition to a different communications service provider does not occur in the middle of a phone call, email, text message, chat session or other communication.

Next, the wireless device determines whether the duration timer is greater than zero. If the duration timer is greater than zero, then the determination of step 324 is made repeatedly. The duration timer tracks how long the wireless device has been in a roaming-only mode. A specified time period may be entered for the duration timer by the user or the user may specify a signal threshold at which the wireless device will return to an automatic mode. A lower value for the duration timer may allow the wireless device to roam for a specified amount of time before attempting to connect to the default communications service provider.

If the duration timer is not greater than zero, the wireless device sets the wireless device to an automatic mode (step 326). During the automatic mode, the wireless device acquires and utilizes signals according to the signals available through the default communications service provider or the PRL. Next, the wireless device resets the MSDC to the default value (step 328) before returning to start the sample duration timer (step 304). The MSDC is reset to a default value so that the wireless device must take a few different received signal strength samples before going into the roaming-only mode. The MSDC is reset in order to give the default communications service provider another opportunity to provide communication services to the wireless device at an expected level of service. Similarly, the wireless device does not remain in a roaming-only mode for an excessive time period, increasing the cost for the user and communications service provider.

Figure 4:
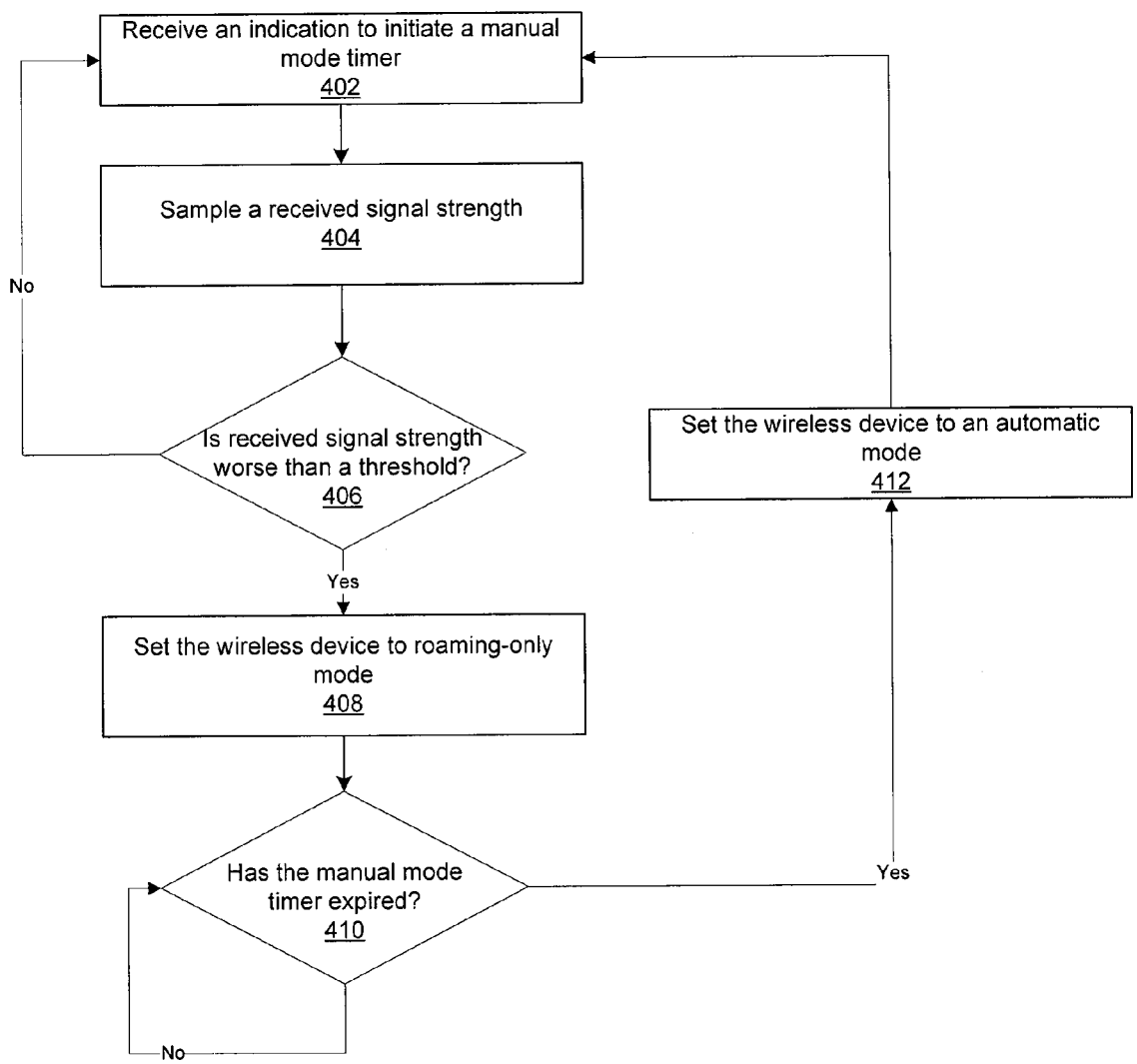
FIG. 4 is a flowchart of a process for manual roaming in accordance with an illustrative embodiment.

FIG. 4 is a flowchart of a process for manual roaming in accordance with an illustrative embodiment. The process of FIG. 4 may also be implemented by a wireless device. The different steps of FIG. 4 may be implemented by an EAR application executed by a processor of the wireless device or built in as part of digital logic or firmware utilized by the wireless device. The process may begin by receiving an indication to initiate a manual mode timer (step 402). The indication of step 402 may be a user selection of a button, touch screen or other element. In one embodiment, the user may access the EAR application to make a selection indicating the received signal strength is insufficient for the communications occurring through the wireless device.

Next, the wireless device samples a received signal strength (step 404). During step 404, the wireless device may measure and rate the signal strength for the wireless network currently being used or for all available wireless networks. Next, the wireless device determines whether the received signal strength is worse than a threshold (step 406). If the received signal strength is not worse than a threshold, the wireless device returns to wait for a received indication to initiate a manual mode timer (step 402).

If the received signal strength is worse than at threshold in step 406, the wireless device sets the wireless device to a roaming-only mode (step 408). The wireless device is set to a roaming-only mode in order to acquire a better signal for purposes of voice and data communications carried on through the wireless device.

Next, the wireless device determines whether the manual mode timer has expired (step 410). If the manual mode timer has not expired, the determination of step 410 is repeated continuously and the wireless device remains in a roaming-only mode. If the manual mode timer has expired in step 410, the wireless device sets the wireless device to an automatic mode (step 412). The manual mode timer may determine a time period during which the wireless device remains in a roaming-only mode.

Once the wireless device has returned to an automatic mode in step 412, the wireless device returns to the default settings for communication and roaming utilized by wireless devices and the user's designated communications service provider. In another embodiment, the wireless device may present a message or signal indicating that the signal strength of the default communications service provider is above at threshold and allow the user to manually select to return to the automatic mode. In yet another embodiment, the user may specify another threshold that may be utilized to return to the automatic mode.

Figure 5:
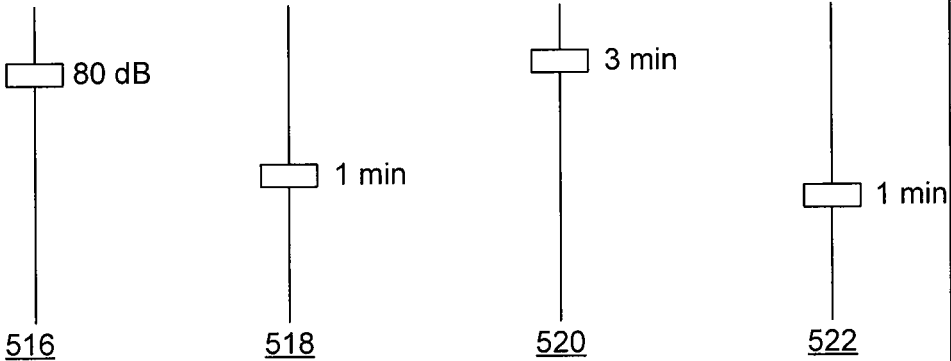
FIG. 5 is a pictorial representation of an EAR interface in accordance with an illustrative embodiment.

FIG. 5 is a pictorial representation of an EAR interface in accordance with an illustrative embodiment. The EAR interface 500 is one embodiment of a graphical user interface that may be presented to a user utilizing a wireless device, web portal or other interface element. For example, the EAR interface 500 may allow the user to establish user preferences including threshold levels utilizing a touch screen, buttons, and scroll wheels of the wireless device. The wireless device may also utilize a verbal, tactile or other interface to display information and interact with the user. The user may make the selections for the EAR application on the wireless device or may make the changes remotely from another client device configured to communicate with the systems of the communications service provider or wireless device.

The EAR interface 500 may include indicators 502, 504, 506, 508, 510, 512, and 514, and graphical selectors 516, 518, 520, and 522. The indicators 502, 504, and 506 may be utilized to determine which mode the EAR application implements on the wireless device. In one embodiment, the indicator 502 may allow the wireless device to automatically go to a roaming-only mode based on the measurements of a number of timers, counters, and a determined signal strength that may be less than at threshold. The indicator 504 may allow a user to select a manual mode during which the user provides an indication that the wireless device is to enter a roaming-only mode. The indicator 506 may allow the user to operate without the EAR application activated.

The indicators 508, 510, 512, and 514 are the numbers, values, thresholds or settings for the threshold value, the sample duration timer, the marginal signal decrementing counter, and the duration timer, respectively as previously described. Each of the indicators 508, 510, 512, and 514 may be modified by a user inserting text using a traditional keyboard, touch screen or other element.

In another embodiment, the user may utilize the graphical selectors 516, 518, 520, and 522 to modify the values for the indicators 508, 510, 512, and 514. For example, a slide bar, scale or other element may be utilized to simply adjust the values for the EAR interface 500. In particular, the EAR interface 500 may allow a user to specify how and when the wireless device utilizes a roaming mode to enhance services and communications received by the wireless device. The graphical selectors 516, 518, 520, and 522 may allow the user to more easily dial in the roaming-only performance of the wireless device based on the user's needs and preferences.

The illustrative embodiments may allow the user to adjust the quality of service received at certain geographic locations based on a personal determination of the value of the communications services as compared to potentially higher roaming costs. For example, if the user is expecting an important business or personal call and knows that the signal strength from the user's default communications service provider is weak at the current location, the user may raise the signal strength threshold requiring the wireless device to find one or more signals that meet the user's specified threshold.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for automatically roaming with a wireless device, comprising:
    sampling a signal strength of a first wireless signal associated with cellular communications at a time interval, wherein the wireless device is configured for the cellular communications including voice and data;
    determining whether the signal strength is less than a threshold for a predetermined time period;
    automatically configuring the wireless device to roam on a second wireless signal associated with the cellular communications in response to the signal strength of the first wireless signal being less than the threshold for the predetermined time period, wherein the wireless device is configured with a preferred roaming list identifying one or more wireless services providers, and wherein the second wireless signal is selected based on an indication in the preferred roaming list that a wireless service provider associated with the second signal is the next available alternate service provider; and
    resetting the wireless device to a default setting for the cellular communications after a second predetermined time period, wherein the threshold and the predetermined time period that the signal strength of the first wireless signal is less than the threshold are enabled to be set by a user of the wireless device, and wherein the time interval, predetermined time period, and second predetermined time period are measured by a sample duration timer, a marginal signal counter, and a duration timer, respectively.

2. The method according to claim 1, further comprising: receiving user preferences for performing the sampling, determining, configuring, and resetting.

3. The method according to claim 1, wherein the sampling is performed based on expiration of a sample duration timer measuring the time interval.

4. The method according to claim 1, further comprising:
    determining whether the wireless device is being utilized by the user, wherein the automatically configuring is performed in response to determining the wireless device is not being utilized by the user.

5. The method according to claim 1, wherein the configuring comprises:
    roaming to the second wireless signal, wherein the second wireless signal is not provided by a default communications service provider.

6. The method according to claim 1, wherein the second wireless signal is provide by a communications service provider according to a priority included in a preferred roaming list.

7. The method according to claim 1, wherein the resetting further comprises communication through the first wireless signal.

8. The method according to claim 1, wherein the predetermined time period is a counter value measured by the wireless device for determining how many times the sampled signal strength has been less than the threshold.

9. The method according to claim 1, wherein the sampling is performed in response to a user input to enter a roaming-only mode.

10. The method according to claim 1, wherein both the first wireless signal and the second wireless signal are utilized for cellular communications including voice and data.

11. A wireless device configured for user selected roaming, comprising:
    signal logic configured to:
        sample a signal strength of a first wireless signal associated with cellular communications at a time interval, based on a user selection, wherein the wireless device is configured for the cellular communications including voice and data;
        determine whether the signal strength is less than a threshold for a first time period;
        automatically configure the wireless device to roam to a second wireless signal associated with the cellular communications in response to the signal strength of the first wireless signal being less than the threshold, wherein the wireless device is configured with a preferred roaming list identifying one or more wireless services providers, and wherein the second wireless signal is selected based on an indication in the preferred roaming list that a wireless service provider associated with the second signal is the next available alternate service provider; and
        reset the wireless device to communicate through the first wireless signal after a second time period has elapsed;
    a plurality of timers in communication with the signal logic, the plurality of timers operable to measure the first time period and the second time period; and
    a user interface configured to receive the user selection and the threshold from a user, wherein the user selection includes a user input for setting the first time period that the signal strength is less than the threshold, and wherein the time interval, first time period, and second time period are measured by a sample duration timer, a marginal signal counter, and a duration timer, respectively.

12. The wireless device according to claim 11, wherein the signal logic roams from the first wireless signal to the second wireless signal in response to reaching a value measured by a counter measuring a number of measurements indicating that the signal strength is below the threshold.

13. The wireless device according to claim 12, wherein the user interface is further configured to receive the first time period, the second time period, and the value from the user.

14. The wireless device according to claim 11, wherein the signal logic resets the wireless device to communicate through the first wireless signal in response to a determination that the sample strength of the first wireless signal is greater than the threshold.

15. A wireless device configured for roaming, comprising:
a processor for executing a set of instructions; and
a memory in communication with the processor, the memory configured to store the set of instructions, the set of instructions being configured to:
sample a received signal strength of one or more wireless signals associated with cellular communications at a time interval, wherein the wireless device is configured for the cellular communications including voice and data; and
automatically switch from a first wireless signal to a second wireless signal associated with the cellular communications in response to the received signal strength of the first wireless signal being utilized by the wireless device being less than a threshold for a time period, and further in response to the wireless device not being in use, wherein the threshold and the time period that the signal strength of the first wireless signal is less than the threshold are enabled to be set by a user of the wireless device, wherein the wireless device is configured with a preferred roaming list identifying one or more wireless services providers, wherein the second wireless signal is selected based on an indication in the preferred roaming list that a wireless service provider associated with the second signal is the next available alternate service provider; and
return to the first wireless signal after at the expiration of a second time period to end roaming, wherein the time interval, time period, and second predetermined time period are measured by a sample duration timer, a marginal signal counter, and a duration timer, respectively.

16. The wireless device according to claim 15, further comprising:
a counter configured to decrease each time the received signal of the wireless device is less than the threshold, wherein the set of instructions activates the wireless device to utilize the second wireless signal in response to the counter being equal to zero.

17. The wireless device according to claim 16, further comprising:
resetting the counter to a default value after a third time period for resetting the counter.

18. The wireless device according to claim 15, further comprising:
receiving user input specifying the interval, the threshold, and the time period through an interface of the wireless device.

* * * * *